United States Patent
Sung

(10) Patent No.: US 12,145,183 B1
(45) Date of Patent: Nov. 19, 2024

(54) DEEP CLEANING METHOD FOR HIGHLY CONTAMINATED SOIL

(71) Applicant: Cleanaway Company Limited, Kaohsiung (TW)

(72) Inventor: Lwon-Kuo Sung, Kaohsiung (TW)

(73) Assignee: Cleanaway Company Limited, Kaohsiung (TW)

( * ) Notice: Subject to any disclaimer, the term of this patent is extended or adjusted under 35 U.S.C. 154(b) by 0 days.

(21) Appl. No.: 18/452,511

(22) Filed: Aug. 18, 2023

(30) Foreign Application Priority Data

May 16, 2023 (TW) .................................. 112118031

(51) Int. Cl.
*B09C 1/02* (2006.01)
*B03B 4/02* (2006.01)
*B03B 5/62* (2006.01)
*B03B 9/00* (2006.01)

(52) U.S. Cl.
CPC .................. *B09C 1/02* (2013.01); *B03B 4/02* (2013.01); *B03B 5/62* (2013.01); *B03B 9/00* (2013.01)

(58) Field of Classification Search
CPC .... B09C 1/02; B03B 4/02; B03B 5/62; B03B 9/00

See application file for complete search history.

(56) References Cited

U.S. PATENT DOCUMENTS 5,056,541 A * 10/1991 Schade .................... B03D 1/02
134/25.1
10,040,104 B2 * 8/2018 Song ........................ B03D 1/02

\* cited by examiner

*Primary Examiner* — Erin F Bergner

(57) ABSTRACT

A deep cleaning method for highly contaminated soil comprises a feeding step, a washing step, a first separation step, a second separation step, a countercurrent washing step, and a wastewater treatment step. The countercurrent washing step is to receive the sand water that completed the second separation step. The sand water is introduced into a countercurrent washing tank from the top, and the clean water is injected into the bottom of the countercurrent washing tank to form a countercurrent washing state. The washed sand is discharged from the bottom of the countercurrent washing tank, and the mud washed from the sand is overflowed by the rising water flow and collected to a wastewater treatment unit. Through the backwashing step, the highly oil-contaminated soil with low mud content can also be applied to the water washing method, thereby expanding the treatable range of oil-contaminated soil.

7 Claims, 2 Drawing Sheets

DEEP CLEANING METHOD FOR HIGHLY CONTAMINATED SOIL

RELATED APPLICATIONS

This application claims priority of Taiwan Application No. 112118031, filed on May 16, 2023. The entire disclosures of all the above applications are hereby incorporated by reference.

FIELD OF THE INVENTION

The present invention relates to a method for cleaning contaminated soil, particularly a deep cleaning method for highly contaminated soil.

BACKGROUND OF THE INVENTION

With the rapid development of industry, the waste produced by related industries may cause oil pollution to soil in varying degrees, making soil contamination more serious. With the increasing awareness of environmental protection and the increasingly stringent laws and regulations, soil contamination has gradually been paid attention to and has become an important part of environmental protection.

Soil contamination can be divided into heavy metal contamination, oil contamination and other contamination (such as polychlorinated biphenyls, etc.). The treatment methods of soil contamination include off-site treatment (burial, solidification, stabilization, heat treatment, etc.), on-site treatment (pickling, water washing) and a series of treatment procedures to achieve the goals of reduction, stabilization, harmlessness, and resource utilization.

When the soil is contaminated by oil products, two treatment methods such as physical washing or chemical washing can be used to clean the contaminated soil. The concentration of pollutants can be reduced to a treatable standard, to reduce the harm to the human body and the environment. Taking the chemical water washing as an example, water and surfactants are added to the contaminated soil to promote the interaction and fusion of oil and water, making oil stains easier to be removed. However, the cost is very high when using surfactants to remove oil stains over a long period of time, and the subsequent treatment of wastewater is also a major problem and not economically beneficial.

The physical washing is to place the soil in a separator and separate the mud and sand in the soil through the vortex flow in the machine. After separation, mud is mixed with water to form sewage and discharged to obtain sand. Therefore, the sewage must be further purified before it can be used in the next separation process. However, this kind of mud-sand separation method is not effective. In addition to residual mud, the sand also contains other pollutants, which cannot meet the quality requirements. Furthermore, if the oil concentration of the soil is high and the mud content is low, the effect of physical washing is even lower.

SUMMARY OF THE INVENTION

One object of the present invention is to provide a deep cleaning method for highly contaminated soil that does not need to add surfactants and can improve the cleaning effect.

The deep cleaning method for highly contaminated soil comprises a feeding step, a washing step, a first separation step, a second separation step, a countercurrent washing step, and a wastewater treatment step. The feeding step is to pour the contaminated soil into a hopper and transport it to a washing machine. The washing step is to add water to the washing machine and mixing with the contaminated soil. The first separation step is to receive the contaminated soil that has completed the washing step and separate the stone and the water with mud and send through a vibrating sieve. The second separation step is to receive the water with mud and send that completed the first separation step. The water with mud and send is separated into sand water containing sand materials with larger particle sizes and mud water containing mud materials with smaller particle sizes through a cyclone separator. The mud water will be discharged to a wastewater treatment unit and the sand water will enter the next step. The countercurrent washing step is to receive the sand water that completed the second separation step. The sand water is introduced into a countercurrent washing tank from the top, and the clean water is injected into the bottom of the countercurrent washing tank to form a countercurrent washing state. The washed sand is discharged from the bottom of the countercurrent washing tank, and the mud washed from the sand is overflowed by the rising water flow and collected to the wastewater treatment unit. In the wastewater treatment step, the mud water in the wastewater treatment unit is subjected to sedimentation, separation, and press filtration to obtain a sludge cake, and the filtrate produced after press filtration can be reused in the previous steps.

In a preferable embodiment, the method further comprising a buffering step between the second separation step and the countercurrent washing step, wherein the sand water finished the second separation step is introduced into a temporary storage tank, and then the sand water is pumped from the temporary storage tank to the countercurrent washing tank.

In a preferable embodiment, the countercurrent washing tank is a tapered structure with a wide top and a narrow bottom. The countercurrent washing tank has a countercurrent washing area located in the center and a recycle area located around the countercurrent washing area. The sand water is introduced into the countercurrent washing area from the top and the clean water is injected into the bottom of the countercurrent washing area through a delivery pipe in the countercurrent washing step. The mud washed from the sand is overflowed from the countercurrent washing area to the recycle area by the rising water flow and then collected to the wastewater treatment unit.

In a preferable embodiment, the method further comprising a dehydration step after the countercurrent washing step. The dehydration step is to stack the washed sand which is discharged from the bottom of the countercurrent washing tank after dehydration, and the mud water produced after dehydration will be discharged to the wastewater treatment unit.

In a preferable embodiment, the wastewater treatment unit includes a mud tank for collecting mud water, a sedimentation tank communicated to the mud tank, a sludge tank communicated to the sedimentation tank, a filter press communicated to the sludge tank, and a clear water tank communicated to the sedimentation tank, and the clear water tank is the source of water for the previous steps.

In a preferable embodiment, the mud water in the mud tank will be transported to the sedimentation tank, the clarified liquid at the top after sedimentation in the sedimentation tank will be diverted to the clear water tank, and the sedimentation sludge is transported to the sludge tank.

In a preferable embodiment, the particle size of the stone is greater than 2 mm, and the particle size of the sand is greater than 0.075 mm.

The characteristic of the present invention is that through the backwashing step, the highly oil-contaminated soil with low mud content can also be applied to the water washing method, thereby expanding the treatable range of oil-contaminated soil. In addition, using this method to clean the contaminated soil within the general pollution range can improve the cleanliness of the washed sand and improve the quality of the end product of this method.

DETAILED DESCRIPTION OF THE INVENTION

The detailed description and preferred embodiments of the invention will be set forth in the following content and provided for people skilled in the art to understand the characteristics of the invention.

Figure 1:
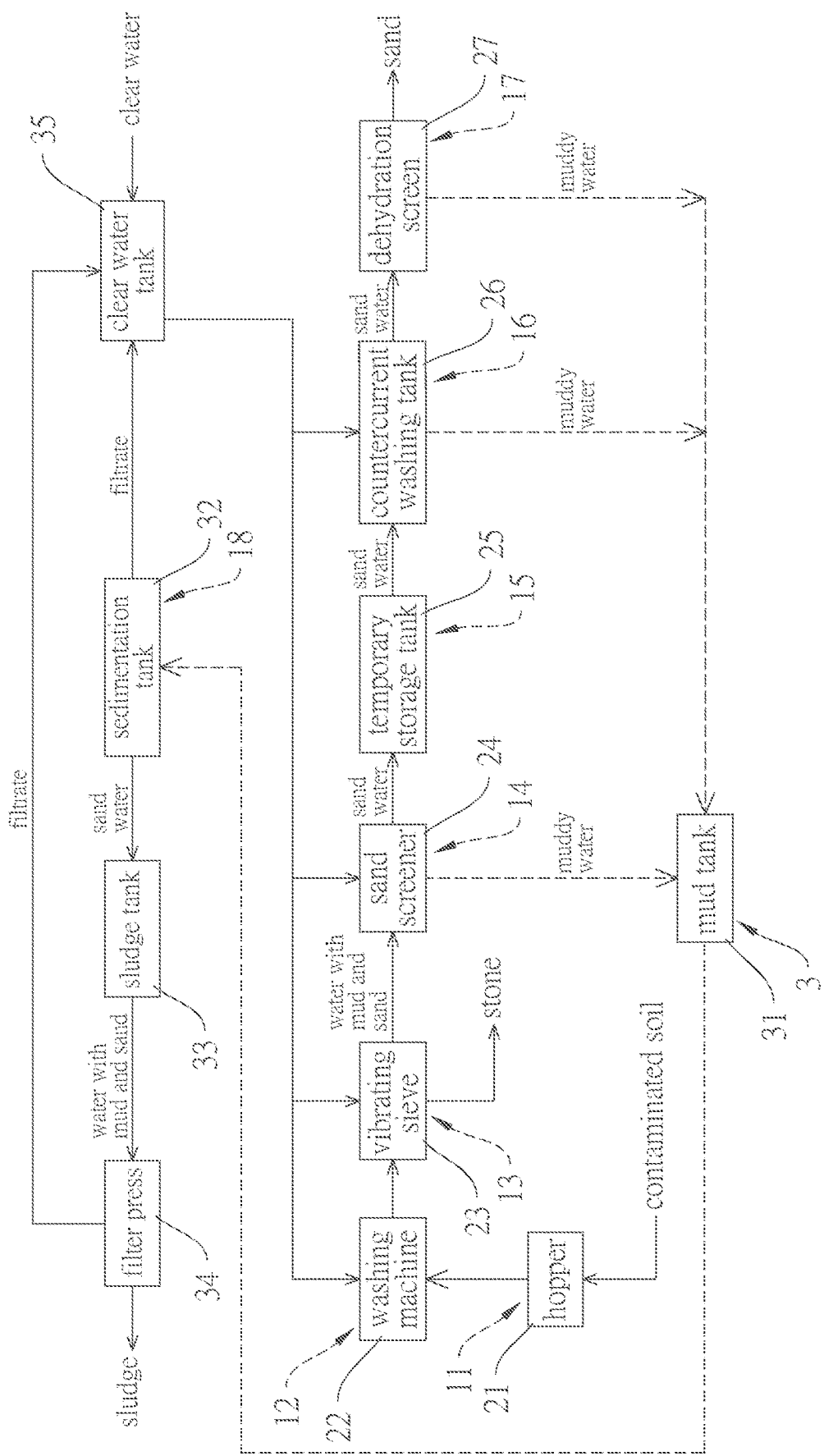
FIG. 1 is a flow chart of one embodiment of the present disclosure.

Referring to FIG. 1, it is a preferred embodiment of a deep cleaning method for highly contaminated soil of the present invention. The method comprises a feeding step 11, a washing step 12, a first separation step 13, a second separation step 14, a buffering step 15, a countercurrent washing step 16, a dehydration step 17, and a wastewater treatment step 18. It should be noted that in this preferred embodiment, the equipment required for the above steps is directly arranged next to an area where the soil needs to be treated, so there is no need to transport the soil to other areas for treatment. In addition, this preferred embodiment is to set up a contaminated soil cleaning system with a processing capacity of 250 tons/hour, but it can be adjusted depending on the processing capacity during actual implementation, and it is not limited to this. Since the equipment required for the above-mentioned steps is not the point of the present invention, their detailed structures will not be described in the following description.

The feeding step 11 is to pour the contaminated soil into a hopper 21, and the contaminated soil falls on a conveyor belt through the hopper and then transported to a washing machine 22. The washing step 12 is to add water to the washing machine 22 and mixing with the contaminated soil. Wherein, the washing machine 22 is provided with a paddle, which can break up the agglomerated materials, and transport the large particle materials to the outlet of the washing machine 22 in a spiral rotation manner.

The first separation step 13 is to receive the contaminated soil that has completed the washing step 12 and separate the stone and the water with mud and send through a vibrating sieve 23. In this preferred embodiment, the first separation step 13 uses the vibrating sieve 23 to screen out stones with a particle size greater than 2 mm. The stones are sifted out, drained, and piled up elsewhere, while the materials with a particle size of less than 2 mm are mixed with water to form muddy water and enter the next step.

0020 The second separation step 14 is to receive the muddy water from the first separation step 13 and separate the muddy water into sand water containing sand materials with larger particle sizes and mud water containing mud materials with smaller particle sizes through a sand screener 24 (or called a cyclone separator). More specifically, the sand screener 24 can divide the mud and sand into sand with a particle size larger than 0.075 mm and mud with a particle size smaller than 0.075 mm. Mud and water flow form muddy water, which is discharged to a wastewater treatment unit 3 from above the sand screener 24 due to the inertia of the water flow. The sand will gather under the sand screener 24 due to gravity to form sand water and enter the next step.

Next, the sand water that completed the second separation step 14 are introduced into a temporary storage tank 25 by gravity in the buffering step 15. then the sand water is pumped from the temporary storage tank 25 to a countercurrent washing tank 26 to perform the countercurrent washing step 16. The temporary storage tank 25 provides a buffer function to prevent a large amount of sand water from directly entering the countercurrent washing tank 26 and affecting the efficiency of the countercurrent washing step 16.

Figure 2:
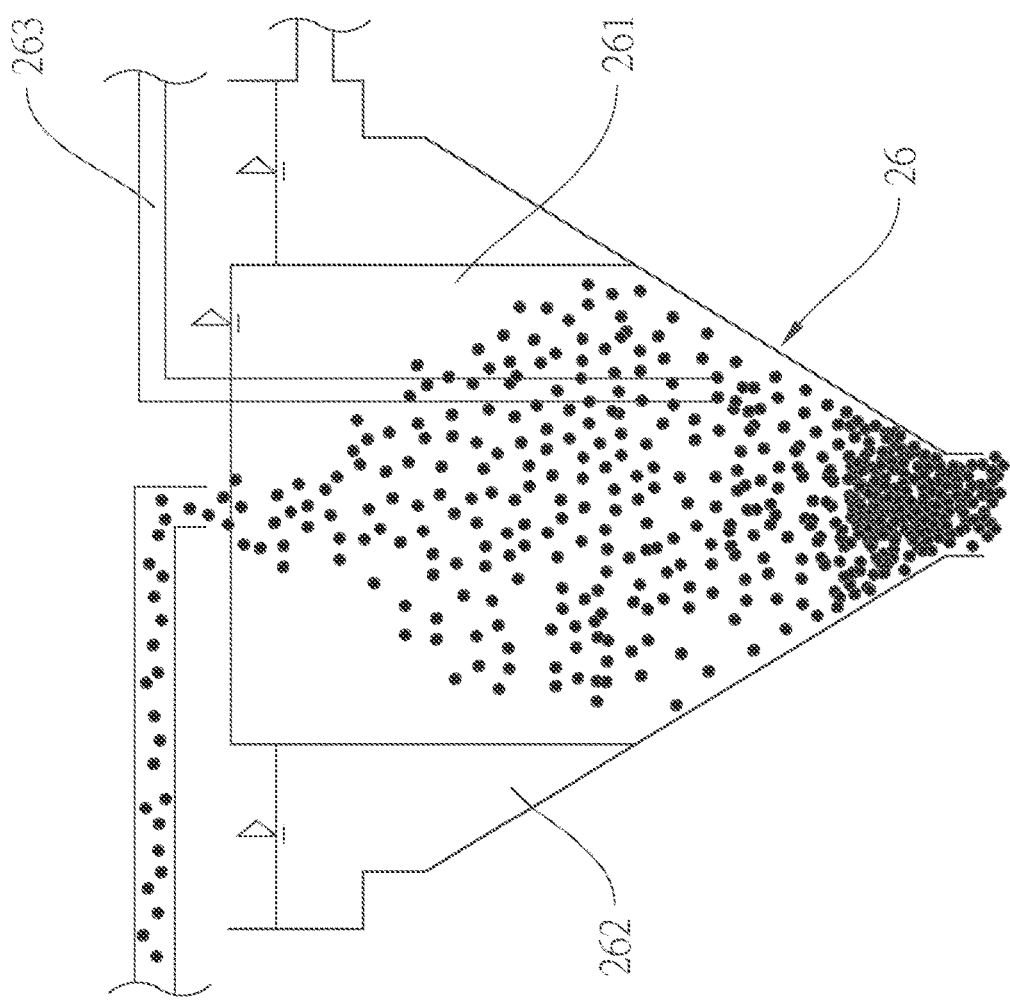
FIG. 2 is a schematic diagram of a countercurrent washing tank.

The countercurrent washing step 16 is to receive the sand water from the temporary storage tank 25 and introduce the sand water into the countercurrent washing tank 26 from above and inject clear water from the bottom of the countercurrent washing tank 26 to form a countercurrent washing state. In this way, the mud attached to the sand 1 can be washed away into the water as much as possible, and the cleaned sand is discharged from the bottom of the countercurrent washing tank 26. The mud washed off from the sand is overflowed by the rising water in the countercurrent washing tank 26 and collected into the wastewater treatment unit 3. More specifically, referring to FIG. 2, the countercurrent washing tank 26 is a tapered structure with a wide top and a narrow bottom. The countercurrent washing tank 26 has a countercurrent washing area 261 located in the center and a recycle area 262 located around the countercurrent washing area 261. In the countercurrent washing step 16, sand water is introduced into the countercurrent washing area 261 from the top, and at the same time, a delivery pipe 263 is inserted into the bottom of the countercurrent washing area 261 to inject clean water. The mud washed from the sand is overflowed from the countercurrent washing area 261 to the recycle area 262 by the rising water flow and then collected into the wastewater treatment unit 3. That is to say, the countercurrent washing step 16 is to further desilt the mud attached to the sand, so that the sand with a particle size greater than 0.075 mm will settle to the bottom of the countercurrent washing tank 26 and then be discharged. The mud with a particle size less than 0.075 mm washed from the sand is overflowed from the countercurrent washing area 261 to the recycle area 262 by the rising water flow and then collected into the wastewater treatment unit 3. It should be noted that the particle size of the stone, sand, and mud mentioned in the aforementioned steps is only the numerical value used in this preferred embodiment. The numerical range can be adjusted depending on the composition of the polluted soil, and it is not limited to this.

The dehydration step 17 is to stack the washed sand discharged from the bottom of the countercurrent washing tank 26 through a dehydration screen 27 after dehydration, and the mud water produced after dehydration will be discharged to the wastewater treatment unit 3.

The muddy wastewater collected from the aforementioned steps into the wastewater treatment unit 3 obtains sludge cake after sedimentation, separation, and press filtration through the wastewater treatment step 18. The filtrate produced after press filtration can be reused in the previous steps.

In this preferred embodiment, the wastewater treatment unit 3 includes a mud tank 31 for collecting mud water, a sedimentation tank 32 communicated to the mud tank 31, a sludge tank 33 communicated to the sedimentation tank 32, a filter press 34 communicated to the sludge tank 33, and a clear water tank 35 communicated to the sedimentation tank 32.

The muddy waste produced by the aforementioned steps will be collected in the mud pool 31, and then transported to the sedimentation tank 32 from the mud pool 31. The sludge is settled after dosing, coagulation, and sedimentation in the sedimentation tank 32. After the sludge is settled, the clarified liquid above is diverted into the clear water tank 35, and the settled sludge is transported to the sludge tank 33.

The sludge tank 33 is used for temporarily storing fluffy sludge, which can buffer the amount of sludge between the sedimentation tank 32 and the filter press 34. In this preferred embodiment, the sludge in the sludge tank 33 is transported to the filter press 34 by a low-pressure pump first. When the pressure of the filter press 34 reaches the set value, it will automatically switch to the air pump to pressurize the sludge to the required pressure with compressed air, and then use the diaphragm plate to reverse pressure to reach the expected moisture content of the sludge cake. Finally, the sludge cake is discharged from the filter press 34, and then transported to the outside by a conveyor belt for stacking, and subsequent processing operations are performed. The filtrate produced after press-filtering is then diverted to the clear water pool 35 for recycling.

The clear water tank 35 is the source of water in the aforementioned steps. When the water in the clear water pool 35 is insufficient, additional water can be added to maintain the normal operation of the system.

It should be emphasized that in the contaminated soil mixed with stones, sand, and mud, since oil is mainly absorbed in the mud, therefore, when the oil concentration of the contaminated soil is high and the mud content is low, the mud will absorb a large amount of oil and cause the oil content to be extremely high. Therefore, the sand separated by water washing needs to further reduce the mud content (from the general 2.5% to 0.5%). Otherwise, even if the separated sand is only attached with a small amount of mud, it cannot be reused because the mud has a very high oil content and cannot pass the inspection.

Therefore, the present invention uses the theory of soil cleaning decrement, the effect of separating the contaminated soil in different particle sizes and pollutant enrichment is achieved by washing with water. Washing the soil with water does not remove the pollutants, but because most of the pollutants are adsorbed by fine particles (soil, or clay), as long as the fine particles are collected, there will be the effect of pollutant enrichment, and subsequent treatment can be carried out. At the same time, it makes the coarse particles (stone/sand) cleaner and can be backfilled directly to achieve the purpose of reducing the amount of contaminated soil.

To sum up, the deep cleaning method for highly contaminated soil of the present invention, by increasing the countercurrent washing step, washes off the mud attached to the sand again in a countercurrent washing manner, further reduces the mud content of the sand, and can expand the treatable range of oil-contaminated soil. Using this method to clean the contaminated soil within the general pollution range can improve the cleanliness of the washed sand. In the case of extreme pollution, it can also ensure that the washed sand can pass the inspection standard and can be backfilled or reused again.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A cleaning method for contaminated soil, the method comprising:
   a feeding step including pouring the contaminated soil into a hopper and transported the contaminated soil to a washing machine;
   a washing step including adding water from a water tank to the washing machine and mixing the water with the contaminated soil;
   a first separation step including sending the contaminated soil that has completed the washing step through a vibrating sieve and separating the contaminated soil into stones and water with mud;
   a second separation step including receiving the water with mud from the first separation step, and sending the water with mud through a cyclone separator to separate the water with mud into sand water containing sand materials with particles larger than a predetermined particle size and mud water containing mud materials with particles smaller than the predetermined particle size, and delivering the mud water to a wastewater treatment unit;
   a countercurrent washing step including receiving the sand water that completed the second separation step, introducing the sand water into a countercurrent washing tank from the top, injecting water from the water tank into the bottom of the countercurrent washing tank to form a countercurrent washing state, discharging the washed sand from the bottom of the countercurrent washing tank, and over flowing mud washed from the sand by rising the water, and delivering mud water washed from the sand to the wastewater treatment unit;
   a wastewater treatment step including subjecting the mud water from the second separation step and the mud water from the countercurrent washing step that has been delivered to the wastewater treatment unit to sedimentation, separation, and press filtration to obtain a sludge cake and a filtrate including water and discharging the filtrate to the water tank.

2. The method of claim 1, further comprising a buffering step between the second separation step and the countercurrent washing step, wherein the sand water finished the second separation step is introduced into a temporary storage tank, and then the sand water is pumped from the temporary storage tank to the countercurrent washing tank.

3. The method of claim 1, wherein the countercurrent washing tank is a tapered structure with a wide top and a narrow bottom, and has a countercurrent washing area located in the center and a recycle area located around the countercurrent washing area, wherein the sand water is introduced into the countercurrent washing area from the top and the water is injected into the bottom of the countercurrent washing area through a delivery pipe in the countercurrent washing step, the mud washed from the sand is overflowed from the countercurrent washing area to the recycle area by the rising water flow and then collected to the wastewater treatment unit.

4. The method of claim 1, further comprising a dehydration step after the countercurrent washing step including stacking the washed sand discharged from the bottom of the countercurrent washing tank, and discharging mud water produced after dehydration to the wastewater treatment unit.

5. The method of claim 1, wherein the wastewater treatment unit includes a mud tank for collecting the mud water from the second separation step and the mud water from the countercurrent washing step, a sedimentation tank communicated to the mud tank, a sludge tank communicated to the sedimentation tank, a filter press communicated to the sludge tank, and the water tank communicated to the sedimentation tank.

6. The method of claim 5, wherein the mud water in the mud tank is transported to the sedimentation tank, a clarified liquid at the top after sedimentation in the sedimentation tank is diverted to the water tank, and the sedimentation sludge is transported to the sludge tank.

7. The method of claim 1, wherein the particle size of the stones is greater than 2 mm, and the predetermined particle size is 0.075 mm.

* * * * *